Patented Apr. 25, 1944

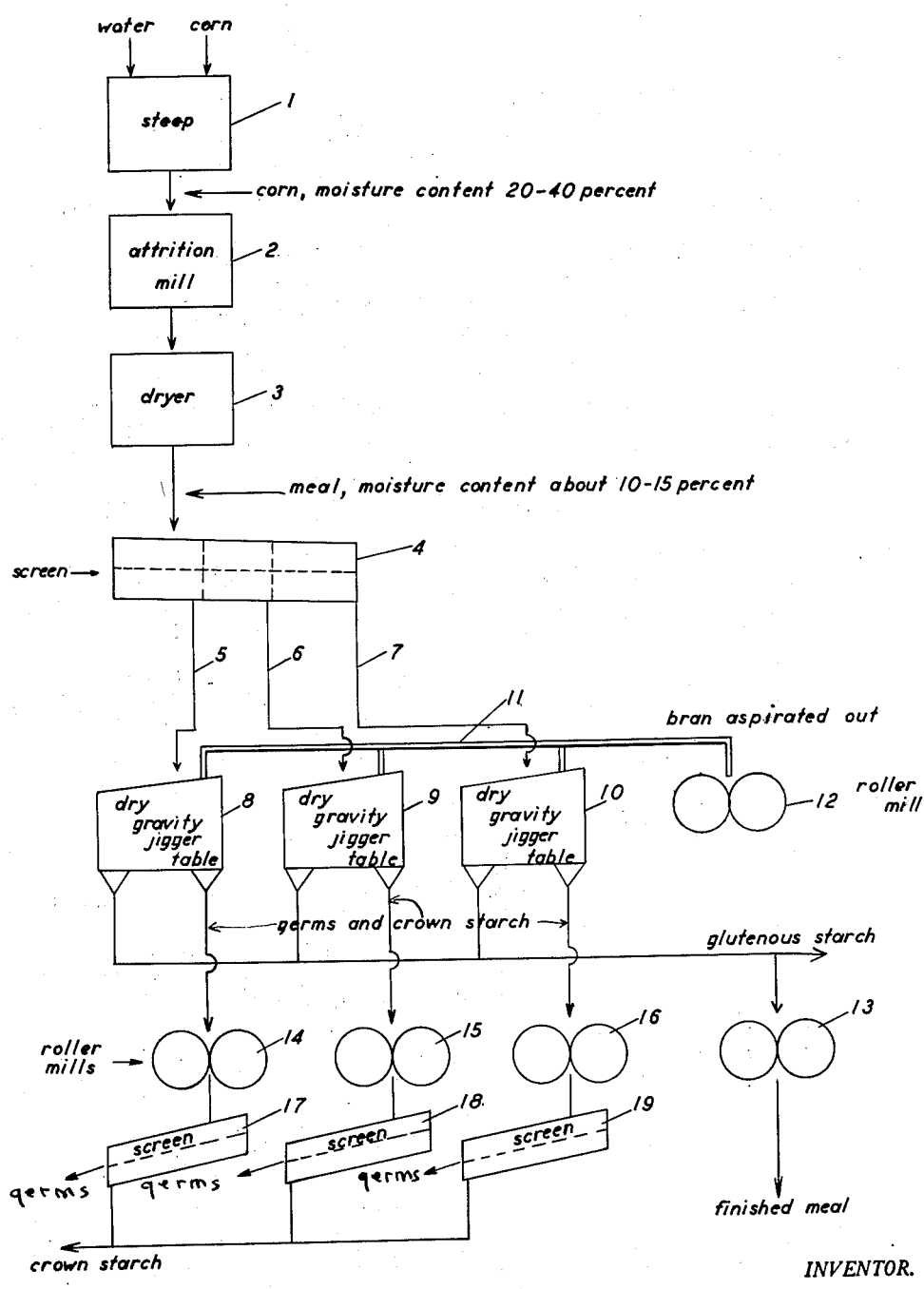

2,347,215

UNITED STATES PATENT OFFICE 2,347,215

DEGERMINATION OF CORN

Ellis Charles Pattee, Cincinnati, Ohio, assignor to National Distillers Products Corporation, New York, N. Y., a corporation of Virginia Application June 14, 1940, Serial No. 340,478

3 Claims. (Cl. 83—42)

This invention relates to the separation of corn particles and is concerned more particularly with the separation of the corn germs from the starch and hulls.

The invention will be understood from the following description read in conjunction with the drawing which is a flow sheet of the process described.

In the separation of particles of corn kernels, to obtain germs, hulls and starch, it has been the practice to grind the corn to a fine meal in order to separate the particles satisfactorily. If the material is ground to a coarse meal, it is difficult to obtain coarse starch particles and coarse germs which are relatively clean of particles of foreign substance. When the corn is ground to a fine state the process of separation is relatively simple. Grinding the corn to a fine meal is satisfactory in the distillation industry, where it is desirable to place all of the starch into the fermentation mash, which can be easily cooked. But if the meal is to be used for making cereals, such as corn flakes, it is desirable to have large grain particles. In addition, in the production of oil from corn germs, it is very difficult to recover the oil from fine germ meal which is the product of the usual separation process.

It is the object of this invention to produce coarse corn meal and coarse germs at the same time, with resulting economy of operation due to the higher recovery of oil from the coarse germ. By the process of this invention the size of the meal and germ particles may be varied to suit the needs of the producer. The number and sizes of the meal fractions in corn degermination are determined by the economic outlet for the finished material. For this reason a process by which a number of different meal sizes may be obtained has an advantage in that production can be regulated in accordance with the demands.

This invention covers a dry corn degerminating process in which the moisture content of the corn kernels is maintained below forty percent (40%). In the operation of the process, the whole kernels are steeped as indicated at 1 in sufficient water to raise their moisture content to between twenty percent (20%) and forty percent (40%). The steeping of the corn may be conducted at any temperature below the gelatinization point of corn starch. After steeping, the moist corn is disintegrated in mill 2, which is preferably an attrition mill having revolving disks with the grinding faces provided with roughened portions such as ridges or projections. The meal coming from the mill is composed of particles of germs, starch and hulls, each of which is relatively free of the other constituents. Thus, the corn germs have relatively little of the starch or hulls adhering to them. This meal is composed of particles relatively large in size, and is of such a state that the corn germ is still whole.

The meal is then dried by any suitable means 3 until its moisture content is about ten percent (10%) to fifteen percent (15%) and it is then passed over screens 4 which separate it into several fractions such as 5, 6 and 7 of varying particle sizes. Each of the fractions is sent to a dry classifier such as 8, 9 and 10 which separates the meal into different portions depending upon the relative density. It has been found that in the use of a dry classifier, a jigger table operates successfully as a separator of this nature. Since the screened meals obtained from the steps above-described are composed of particles of varying densities, separation may be made on this basis. For example, bran has a high absolute density but due to its large surface in relation to weight, in a dry classifier it acts as a light material. Starch is relatively heavy, and this is especially true of glutenous starch. Germs and the soft crown starch from the center of the kernel are relatively light. Thus, when the mixture of germ, bran and starch is passed over the gravity separator, the heavy glutenous starch is separated at one end, and the germs and crown starch separate to the opposite end. Between the two ends there is a graded mixture concentrated toward the respective germ and glutenous starch ends. Since the bran is comparatively light and fluffy it forms as a layer above the germs, and may be easily separated from the germ by an air draft to carry it off of the separator table as indicated at 11.

The three components of the meal may thus be separated into bran, glutenous starch and germs, and are then ready for milling. In the milling of the bran, it is reduced in size in a roller mill 12 and any germ or starch particles which may have adhered to or been carried along with the bran are thus disintegrated. In roller mill 13, the glutenous starch is broken up to the desired meal size. If, however, the glutenous starch is desired as a coarse meal, it is not necessary to have any milling action. The milling of the germ fraction as indicated at 14, 15 or 16 results in the flattening of the germs, and at the same time any starch particles which may have adhered to the germs are disintegrated and thus easily removed. In the rolling of the germs, it is necessary that they contain approximately ten to fifteen percent (10%-15%) moisture, since in that condition the germs are plastic and the milling only flattens but does not break them. On the other hand, the starch particles having such a moisture content are friable and thus disintegrate under the milling pressure.

After the milling operation each fraction may be then screened as indicated at 17, 18 or 19 into the different sizes as desired. In the screening of the flattened milled germ fractions, the size of the openings should be approximately the same size as the diameters of the germ meal particles before they are sent to the roller mills. In this manner, the flattened germs are separated from the disintegrated starch particles.

The germs are thus freed of any starch, but at the same time have maintained their oil content, so that in the extraction of their oil the operation is economical as in the case of the milling of the original germ itself. The starch may be separated into any desired size and as a consequence has many more uses and wider markets.

I claim:

1. In the separation of corn kernels into their constituent substances, by a process which includes steeping such kernels to a moisture content between twenty percent (20%) and forty percent (40%), milling such kernels thereby producing a milled corn broken to the extent necessary to separate the bran, the glutenous starch and the germs and crown starch, drying the milled corn so produced to a moisture content substantially between ten percent (10%) and fifteen percent (15%) and the separation of the milled corn into fractions of different sizes by screening, each such fraction containing germs and crown starch and glutenous starch; the steps of dry gravity jigging at least one such fraction whereby there is separated therefrom a portion consisting predominantly of germs and crown starch and a portion consisting predominantly of glutenous starch.

2. In the separation of corn kernels into their constituent substances, by a process which includes steeping such kernels to a moisture content between twenty percent (20%) and forty percent (40%), milling such kernels thereby producing a milled corn broken to the extent necessary to separate the bran, the glutenous starch and the germs and crown starch, drying the milled corn so produced to a moisture content substantially between ten percent (10%) and fifteen percent (15%) and the separation of the milled corn into fractions of different sizes by screening, each such fraction containing germs and crown starch and glutenous starch; the steps of dry gravity jigging at least one such fraction whereby there is separated therefrom a portion consisting predominantly of germs and crown starch and a portion consisting predominantly of glutenous starch, and subjecting the material undergoing jigging to the action of an air draft whereby the bran is carried away.

3. In the separation of corn kernels into their constituent substances, by a process which includes steeping such kernels to a moisture content between twenty percent (20%) and forty percent (40%), milling such kernels thereby producing a milled corn broken to the extent necessary to separate the bran, the glutenous starch and the germs and crown starch, drying the milled corn so produced to a moisture content substantially between ten percent (10%) and fifteen percent (15%) and the separation of the milled corn into fractions of different sizes by screening, each such fraction containing germs and crown starch and glutenous starch; the steps of dry gravity jigging at least one such fraction whereby there is separated therefrom a portion consisting predominantly of germs and crown starch and a portion consisting predominantly of glutenous starch, thereafter rolling the said portion consisting predominantly of germs and crown starch while maintaining a moisture content between ten percent (10%) and fifteen percent (15%) thereby flattening the germ particles contained in such portion and then screening such portion through a screen of a size adapted to retain the said flattened germ particles while passing the particles of crown starch.

ELLIS CHARLES PATTEE.